(12) United States Patent
Richman et al.

(10) Patent No.: US 6,288,832 B1
(45) Date of Patent: Sep. 11, 2001

(54) APPARATUS AND METHODS FOR USING ACHROMATIC PHASE MATCHING AT HIGH ORDERS OF DISPERSION

(76) Inventors: Bruce Richman, 1134 Portola Meadows Rd., Apt. 124, Livermore, CA (US) 64550; Rick Trebino, 340 Kelson Dr., Atlanta, GA (US) 30327; Scott Bisson, 143 Diamond Dr., Livermore, CA (US) 94550; Erkin Sidick, 3897 Aragon Ave., San Ramon, CA (US) 94583

(*) Notice: Subject to any disclaimer, the term of this patent is extended or adjusted under 35 U.S.C. 154(b) by 0 days.

(21) Appl. No.: 09/187,721

(22) Filed: Nov. 5, 1998

Related U.S. Application Data

(60) Provisional application No. 60/065,264, filed on Nov. 6, 1997.

(51) Int. Cl.$^7$ ........................................................ G02F 1/39

(52) U.S. Cl. .......................... 359/330; 359/326; 359/328

(58) Field of Search ................................... 359/326–332, 359/837

(56) References Cited

U.S. PATENT DOCUMENTS

| | | | |
|---|---|---|---|
| 4,961,195 | * 10/1990 | Skupsky et al. | 359/328 X |
| 5,625,499 | 4/1997 | Chen | 359/831 |
| 5,633,883 | 5/1997 | Shi et al. | 372/20 |
| 5,648,866 | 7/1997 | Trebino et al. | 359/326 |
| 5,710,658 | 1/1998 | Jacobson et al. | 359/328 |

OTHER PUBLICATIONS

Richman, B.A., Bisson, S.E., Trebino, R., Mitchell, M., Sidick, E., "Achromatic phase matching for tunable second-harmonic generation by use of a grism" Optics Letters, Opt. Soc. Am., vol. 22, No. 16, Aug. 1997, p. 1223–1225.

Wang, J., Dunn, M.H., Rae, C.F., "Polychromatic optical parametric generation by simultaneous phase matching over a large spectral bandwidth" Optics Letters, Opt. Soc. Am., vol. 22, No. 11, Jun. 1997, p. 763–765.

Kane, S. Squier, J., "Grism–pair stretcher–compressor system for simultaneous second– and third–order dispersion compensation in chirped–pulsed amplification". J. Opt. Soc. Am. B, vol. 14, No. 3, Mar. 1997, p. 661–665.

Gale, G.M., Cavallari, M., Driscoll, T.J., Hache, F., "Sub–20–fs tunable pulses in the visible from an 82–MHz optical parametric oscillator" Optics Letters, Opt. Soc. Am., vole 20, No. 14, Jul. 1995, p. 1562–1564.

Cheville, R.A., Reiten, M.T., Halas, N.J., "Wide–bandwidth frequency doubling with high conversion efficiency" Optics Letters, Opt. Soc. Am., vol. 17, No. 19, Oct. 1992, p. 1343–1345.

Skeldon, M.D., Craxton, R.S., Kessler, T.J., Seka, W., Short, R.W., Skupsky, S., Soures, J.M., "Efficient Harmonic Generation with a Broad–Band Laser". IEEE J. Quantum Electronics, vol. 28, No. 5, May 1992, p. 1389–1399.

(List continued on next page.)

Primary Examiner—John D. Lee
(74) Attorney, Agent, or Firm—Timothy P. Evans

(57) ABSTRACT

Achromatic phase-matching (APM) is used for efficiently multiplying the frequency of broad bandwidth light by using a nonlinear optical medium comprising a second-harmonic generation (SHG) crystal. Stationary optical elements whose configuration, properties, and arrangement have been optimized to match the dispersion characteristics of the SHG crystal to at least the second order. These elements include a plurality of prismatic elements for directing an input light beam onto the SHG crystal such that each ray wavelength is aligned to match the phase-matching angle for the crystal at each wavelength of light to at least the second order and such that every ray wavelength overlap within the crystal.

32 Claims, 10 Drawing Sheets

OTHER PUBLICATIONS

Cahill, P.A., Singer, K.D., "Anomalous–Dispersion as a Phase–Matching Technique for Second Harmonic Generation" Sandia National Laboratories SAND Report No. 90–2058C Published Oct., 1990, 14 printed pages.

Short, R.W., Skupsky, S., "Frequency Conversion of Broad-Bandwidth Laser Light" IEEE J. Quantum Electronics, vol. 26, No. 3, Mar. 1990, p. 580–588.

Szabó, G., Bor, Z., "Broadband Frequency Doubler for Femtosecond Pulses". Appl. Phys. B, vol. 50, 1990, p. 51–54.

Martínez, O.E., "Achromatic Phase Matching for Second Harmonic Generation of Femtosecond Pulses" IEEE J. Quantum Electronics, vol. 25 No. 12, Dec. 1989, p. 2464–2468.

Saikan, S., Ouw, D. Schäfer, F.P., "Automatic phasematched frequency–doubling system for the 240–350nm region" Appl. Opt., vol. 18, No. 2, Jan. 1979, p. 193–196.

Krasinski, J., Sieradzan, A., "An Improved Automatically Tunable Second Harmonic Generation of Dye Laser" Optics Communications, vol. 26, No. 3, Sep. 1978, p. 389–390.

Volosov, V.D., Goryachkina, E.V., "Compensation of phase-matching dispersion in generation of nonmonochromatic radiation harmonics. I. Doubling of neodymium–glass radiation frequency under free–oscillation conditions". Sov. J. Quantum Electron., Am. Instit. Phys., vol. 6, No. 7, Jul. 1976, p. 854–857.

Volosov, V.D., Karpenko, S.G., Kornienko, N.E., Strizhevskii, V.L., "Method for compensating the phase–matching dispersion in nonlinear optics" Sov. J. Quantum Electron., Am. Instit. Phys., vol. 4 No. 9 Mar. 1975, p. 1090–1098.

* cited by examiner

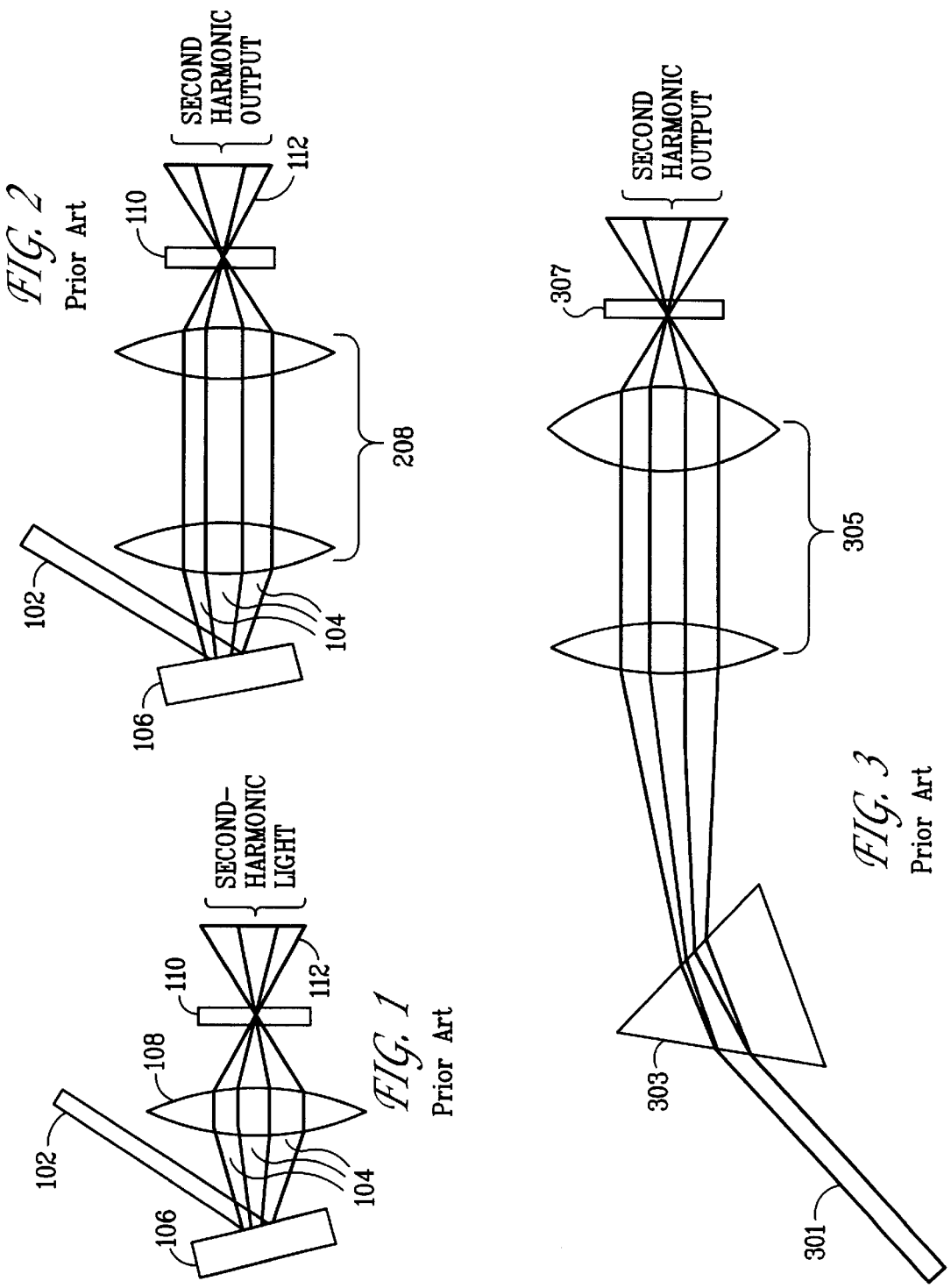

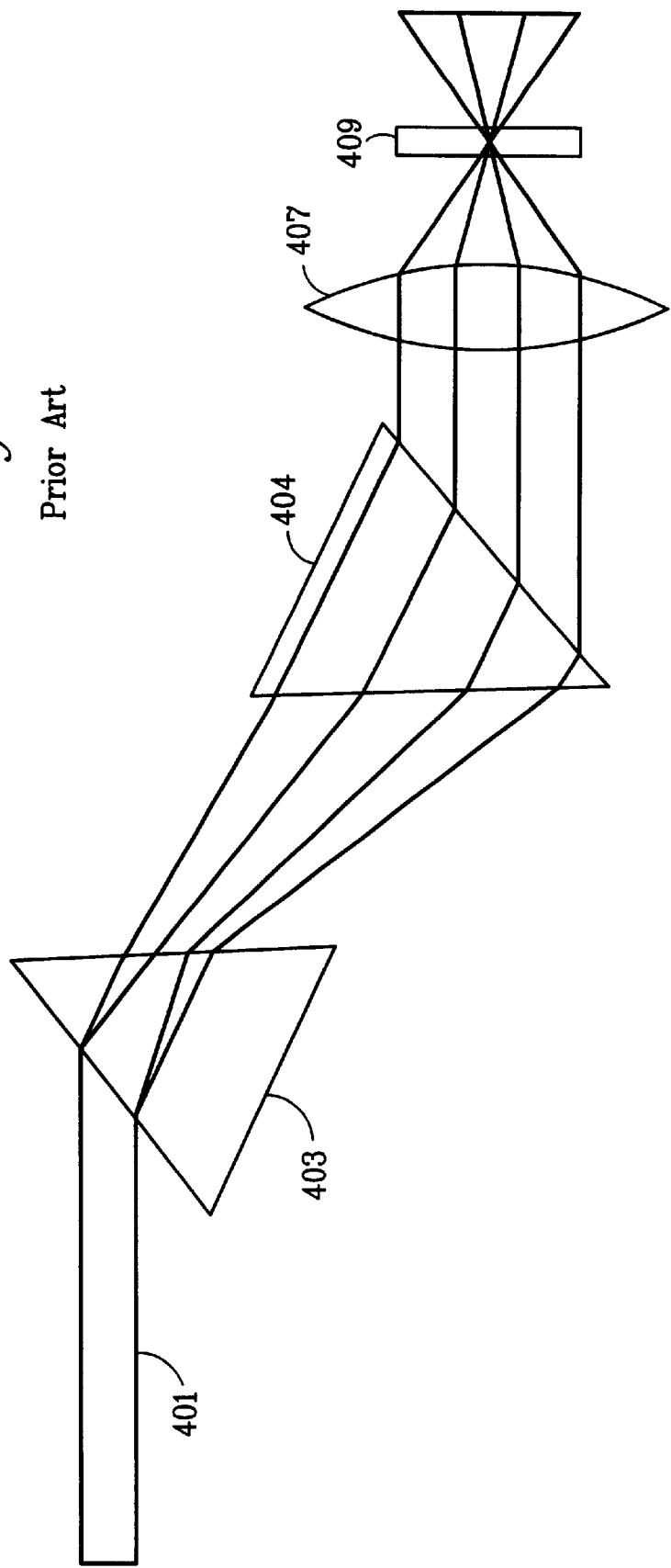

APPARATUS AND METHODS FOR USING ACHROMATIC PHASE MATCHING AT HIGH ORDERS OF DISPERSION

STATEMENT OF PRIORITY

This following application for U.S. patent claims the benefits of U.S. Provisional Patent Application Serial No. 60/065,264, filed on Nov. 6, 1997.

STATEMENT OF GOVERNMENT INTEREST

This invention was made with Government support under contract DE-AC04-94AL85000 awarded by the U.S. Department of Energy to Sandia Corporation. The Government has certain rights in this invention.

BACKGROUND OF THE INVENTION

This invention relates in general to a system and method for nonlinear frequency conversion tunable laser light using achromatic phase-matching, and in particular to an achromatic phase-matching optical system and method which exactly matches the high order dispersion characteristics of nonlinear optical materials.

Many applications require broadly tunable UV light. No such laser source exists, however, so tunable UV is usually obtained by frequency-doubling a tunable laser in the visible and near-IR by using nonlinear optical effects such as a second harmonic generation process. Such processes are phenomenon which derive from nonlinear polarization effects of certain material media. The effect depends upon crystal structure, particularly anisotropic structure. Commonly used crystals are β-barium borate ("BBO"), potassium dihydrogen phosphate ("KDP") and lithium triborate ("LBO").

Because frequency-doubling, therefore, involves passing light through a nonlinear crystal, and the effects of its wavelength-dependent refractive index must be taken into account. In particular, in order for frequency doubling to take place in the crystal, the refractive index of the incident light alt the "fundamental" wavelength must equal the refractive index of the frequency doubled light to be produced. Since the refractive index of the crystal varies botlr with the angle of incidence and with the frequency of the input beam it is apparent the that absent extraordinary precaution only a very narrow range of frequencies of a broadband beam can enter a crystal at the appropriate incident angle for efficient frequency doubling. Unfortunately, this procedure is sensitive to vibrations and can be unreliable, despite the use of feedback. In addition, it produces undesirable beam walk as the laser tunes, which must be corrected with yet another moving part.

Second-harmonic generation of light (hereafter referred to as "SHG") the generation of light of twice the optical frequency of input laser light, has been an essential tool of laser research for many years. It is used widely to generate ultraviolet light because such wavelengths are difficult to generate directly from a laser. Indeed, this technique is often used to generate visible light from a near-infrared laser because it is easier to generate near-infrared laser light than it is to generate visible light. In general, however, it is possible to frequency-double light from virtually all visible and near-infrared lasers.

A particular type of laser light which is important to frequency-double is broadband light. However, the use of SHG processes to frequency-double broadband light which is incoherent has proved to be difficult and inefficient. (In general, ultrashort pulses generated by lasers can be considered broadband light whose frequencies are in phase while incoherent light can be considered broadband light whose frequencies are randomly phased.) These two types of light are difficult to frequency-double due to their respective large bandwidths. As a result of the large bandwidths, efficient methods for frequency-doubling both of these types of light have not been developed.

The efficiency $\eta$ of a SHG process depends on several factors. A first factor is the nonlinear coefficient of a SHG crystal used. This factor depends on internal properties of the crystal and can only be improved by manipulating the composition of the crystal.

Second, $\eta$ is proportional to the square of the length of the crystal, L, the distant through which light ray propagate through the crystal. Thus, thick crystals yield much higher efficiency than thin ones.

Third, $\eta$ depends on the laser intensity and is, typically, directly proportional to the laser intensity. Consequently, continuous-beam lasers, which have relatively low intensity, frequency-double inefficiently while pulsed lasers, which generally achieve higher intensity, frequency-double more efficiently. In general, the shorter the pulse the more efficiently it frequency-doubles, given a fixed energy per pulse.

As earlier noted, in order for frequency-doubling to take place in a SHG crystals, the refractive index of the input laser light (again, the "fundamental" wavelength) must equal the refractive index of the frequency-doubled light to be produced. Since the refractive index of a crystal is a function of both the incidence angle and frequency of the input beam different incidence angles must be used to obtain maximum efficiency $\eta$ for different wavelengths. The requirement that a wavelength enter the crystal at the appropriate angle necessary to frequency-double most efficiently will be referred to hereinafter as the "phase-matching condition," or simply "phase-matching" for short. The angle will be referred to as the "phase-matching angle," and is a function of wavelength.

Because the efficiency $\eta$ of the SHG process is strongly "peaked" with respect to the entrance angle for a given wavelength and also with respect to wavelength for a given angle only a small very narrow range of wavelengths near the exact phase-matching wavelength can still yield highly efficient SHG process. The range of wavelengths that achieves high-efficiency frequency-doubling for a single angle is called the crystal's "phase-matching bandwidth" for that angle. If the input laser light contains frequencies outside this bandwidth, such frequencies will not produce their corresponding second harmonic (i.e., will not be frequency-doubled and the efficiency of the overall process is reduced.

When the crystal bandwidth is greater than the input light bandwidth, the above effect can be neglected. However, when the crystal bandwidth is less than the bandwidth of the input light, the SHG efficiency is proportional to the crystal bandwidth, yielding a fourth factor. In this case, the efficiency can be written approximately as:

$$\eta \propto d^2 / L^2 \left(\frac{\Delta \lambda_{cr}}{\Delta \lambda_l}\right)$$

where d is the nonlinear coefficient of the crystal, I is the intensity of the light, L is the length of the crystal through which the light propagates, $\Delta \lambda_{cr}$ is the bandwidth of the crystal, and $\Delta \lambda_l$ is the bandwidth of the incident light.

Furthermore, the bandwidth, $\Delta\lambda_{cr}$ of an SHG crystal is given by:

$$\Delta\lambda_{cr} = \frac{\frac{\lambda}{4l}}{\left(\frac{dn}{d\lambda}\right)_t - \left(\frac{dn}{d\lambda}\right)_s}$$

where $\lambda$ is the wavelength of light and $dn/d\lambda$ is the derivative cof the refractive index n with respect to wavelength at the appropriate polarization of the fundamental wavelength and second harmonic wavelength, indicated by the subscripts, f and s, respectively.

Thus, the bandwidth of an SHG crystal is a function of the crystal's refractive-index vs. wavelength curve: a fundamental property of the crystal. Furthermore, the bandwidth is inversely proportional to the crystal length. Hence, if one attempts to increase the conversion efficiency by increasing the crystal length, one must also increase the precision of the phase-matching thereby reducing the tolerance for error in the entrance angle of the incoming beam.

Various attempts to improve the efficiency of the SHG process have been and continue to be made. Several researchers have introduced achromatic phase-matching (APM) devices that use angular dispersion so that each wavelength enters the nonlinear crystal at its appropriate phase-matching angle as a way of increasing the bandwidth of the crystal and therefore, increase its efficiency. The crystal and all dispersing optics remain fixed. Because such systems have no moving parts, they are inherently instantaneously tunable, and can be used for nonlinear conversion of tunable or broadband (such as ultrashort) radiation. Most of these devices have used gratings or prisms in combination with lenses which are sensitive to translational misalignment. Also, previous work has considered only the lowest order (linear) term of the media-created dispersion and the phase-matching angle tuning function. Bandwidths of about 10 times the natural bandwidth of the crystal were achieved; larger bandwidths were only obtained by using a divergent beam at the expense of conversion efficiency.

The relationship between the phase-matching angle and the wavelength $\lambda$ is best approximated by a high order polynomial. By modeling an angularly dispersive optical system such that the dispersion angle(s) of the light propagating through that system, as a function of the wavelength (s), match the phase-matching angle(s) of the SHG crystal, again as a function of wavelength, in both the first and the second order terms of the polynomial, it is possible to bring a much broader band of light wavelengths into the SHGI crystal at the optimum angles for frequency doubling (see FIG. 7). The instant invention seeks to implement this process for increasing the efficiency of frequency doubling through the application of this technique.

The crystal dispersion and phase-matching-angle tuning functions have now been modeled exactly using Sellmeier equations. A "grism" (a prism having a transmission or reflection grating on one surface), which combines the high dispersion property of gratings with the optimum first and second-order behavior of the dispersion angle tuning function has been used in combination with other elements in order to achieve phase-matching over a broader range of incident light wavelengths. Unfortunately, grisms with high diffraction efficiency are not yet available. Indeed, no previous APM device has simultaneously achieved high efficiency and a tuning range greater than approximately 10 times the crystal bandwidth. Furthermore, previous attempts to coalign the otherwise divergent and dispersed second-harmonic beams after passage through the SHG crystal were only partially successful, due in part, to the insufficient precision in matching the second-harmonic dispersion function to the phase-matching function.

An attempt to improve the efficiency of the SHG process is to carry out achromatic phase-matching of the laser pulse incident upon the SHG crystal. FIGS. 1 and 2 show two such conventional approaches. As illustrated, the input light beam 102 is dispersed into its individual frequency components 104 using a diffraction grating 106. As a result, the frequency components 104 of the input light will each propagate at a different angle, with adjacent frequencies having adjacent angles of propagation. Then, using a single lens 108 (FIG. 1) or a two-lens telescope 208 (FIG. 2), these light rays are recombined at the SHG crystal 110. In this manner, all frequencies overlap at the same point and each frequency enters the crystal 110 at its optimal phase-matching angle. Thus, each frequency component of the laser pulse efficiently frequency doubles. In other words, each frequency component essentially acts as an independent and narrowband process, each of which can be quite efficient when a relatively thick crystal is used. Since each frequency component can be treated as a narrowband beam that does not require an SHG crystal with a large bandwidth, a relatively thick crystal can be used.

It is important to note that, because the second harmonic beam produced will be dispersed at an angle, an analogous optical apparatus must be used on the output side of the crystal to reconstruct, i.e., to coalign onto a single path all of the second-harmonic rays/beams within the converted bandwidth.

While these designs potentially achieve improved efficiency in the SHG process itself, they introduce a new inefficiency associated with the diffraction grating. Diffraction gratings are not particularly efficient, and since an additional diffraction grating is required to coalign the second harmonic rays/beams on the other side of the SHG crystal, efficiency is reduced even more. This is especially true if the diffraction grating must operate on ultraviolet light, which will be the most common case in SHG processes. When the inefficiencies of the diffraction gratings 106 are considered, the overall efficiency of the SHG process is reduced by roughly a factor of 4. While the overall efficiency of these designs is still greater than that typically obtainable without achromatic phase-matching using standard crystals, the efficiency is not sufficiently improved that achromatic phase-matching has found practical use.

An alternative approach uses prisms instead of diffraction gratings to disperse the input beam. Both disperse light into its frequency components, but prisms can be anti-reflection-coated or used at Brewster's angle and hence, can result in insignificant loss of efficiency. However, prisms typically have about one tenth the dispersion, which is required for a typical achromatic: phase-matching situation.

As illustrated in FIGS. 3 and 4, in such designs the prisms have been used in conjunction with lens devices to amplify the prism dispersion to appropriate values. In FIG. 3, the input light 301 is incident on a single prism 303 and a two-lens telescope 305 is used to amplify the dispersion of the prism 303 and to focus the light onto the SHG crystal 307. In FIG. 4, light 401 is passed through two appositely oriented prisms 403, 404 and then directed through a single lens 407 to recombine the various frequencies in the SHG crystal 409.

The device depicted in FIG. 3 achieves sufficient dispersion because the two-lens telescope 305 amplifies the dispersion of the prism by 1/M, where M is the magnification of the telescope. A problem associated with such a design is that the group velocity dispersion (the tendency for red wavelengths to travel faster than blue wavelengths) in the system is always positive. Thus, the pulse spreads in time greatly reducing the efficiency of the overall systems for most types of ultrashort light pulses as more fully described below.

The device of FIG. 4 achieves sufficient dispersion because a sufficiently short-focal-length lens 407 can be used to recombine the spatially dispersed rays out of the two-prism assembly to achieve the desired dispersion. While this design can achieve zero (or negative) group-velocity dispersion, it suffers from a different flaw. The angle at which the light rays are incident at the crystal is dependent upon the input position of the input light beam 401 relative to the lens, and in fact, any system which uses lenses is sensitive to the exact position of the lenses.

Finally, as with second-harmonic conversion, other nonlinear optical conversion processes also require angular phase-matching. such processes are mathematically more complex than SHG, but the angles of all input beams must still be precisely controlled to provided efficient phase-matching. Similarly to SHG, the phase-matching angles of all input beams and the resultant angles of all output beams are each a function of all their wavelengths and, in some cases, of the input angles, as well.

SUMMARY OF THE INVENTION

It is therefore an object of this invention to provide an optical system for performing achromatic phase-matching by matching the dispersion angles of input rays/beams to the phase-matching angles of those rays/beams to a high order, and to similarly coalign the converted output rays/beams.

It is another object to provide an achromatic phase-matching optical system, for use in a SHG process, having elements configured to very closely match the first and second order terms of the angular dispersion to the first and second order terms of the phase-matching angle of the SHG crystal such that the angular dispersion at all incident frequencies of a broadband pulse of light (or tunable) passing through the elements is such that each given frequency enters the SHG crystal sufficiently close to its exact phase-matching angle that nonlinear conversion is efficient.

It is yet another object of this invention to provide an optical parametric amplifier wherein the instant invention is used to align a "seed" signal beam into the nonlinear crystal at appropriate angle for phase matching and is then "pumped" by another beam of greater power, transferring that power to the seed beam and amplifying it at the expense of the pump beam.

It is still another object of this invention to provide an optical parametric oscillator wherein the nonlinear crystal is contained with in the resonator cavity, and one which arranged with APM elements on either side of the nonlinear crystal to maintain the phase matched condition in both direction in the resonator cavity.

Yet another object of this invention is to provide an optical parametric oscillator using APM as described herein wherein a mode-locI(ing device is introduced into the oscillator optical path and the path length adjusted for any of a plurality of resonant beat frequencies.

To achieve these and other objects, there is provided an apparatus and method for efficiently converting a large bandwidth light pulse into a similarly large bandwidth pulse of light whose frequency is a multiple of its original incoming frequency by means of a nonlinear optical medium. If the nonlinear responding medium is a SHG crystal, the light beam incident upon the crystal is passed though the crystal and is frequency-doubled. It should be noted, however, that the instant invention is not limited solely to frequency doubling nonlinear responses.

BRIEF DESCRIPTION OF THE DRAWINGS

The instant invention will be better understood by reference to the detailed description of the preferred embodiments of the invention with reference to the following drawings in which:

FIG. 1 illustrates a conventional achromatic phase-matching system;

FIG. 2 illustrates another conventional achromatic phase-matching system;

FIG. 3 illustrates a conventional achromatic phase-matching system using a single prism;

FIG. 4 illustrates a conventional achromatic phase-matching system using two prisms and a single lens;

DETAILED DESCRIPTION OF THE INVENTION

PREFERRED EMBODIMENT

Figure 5:
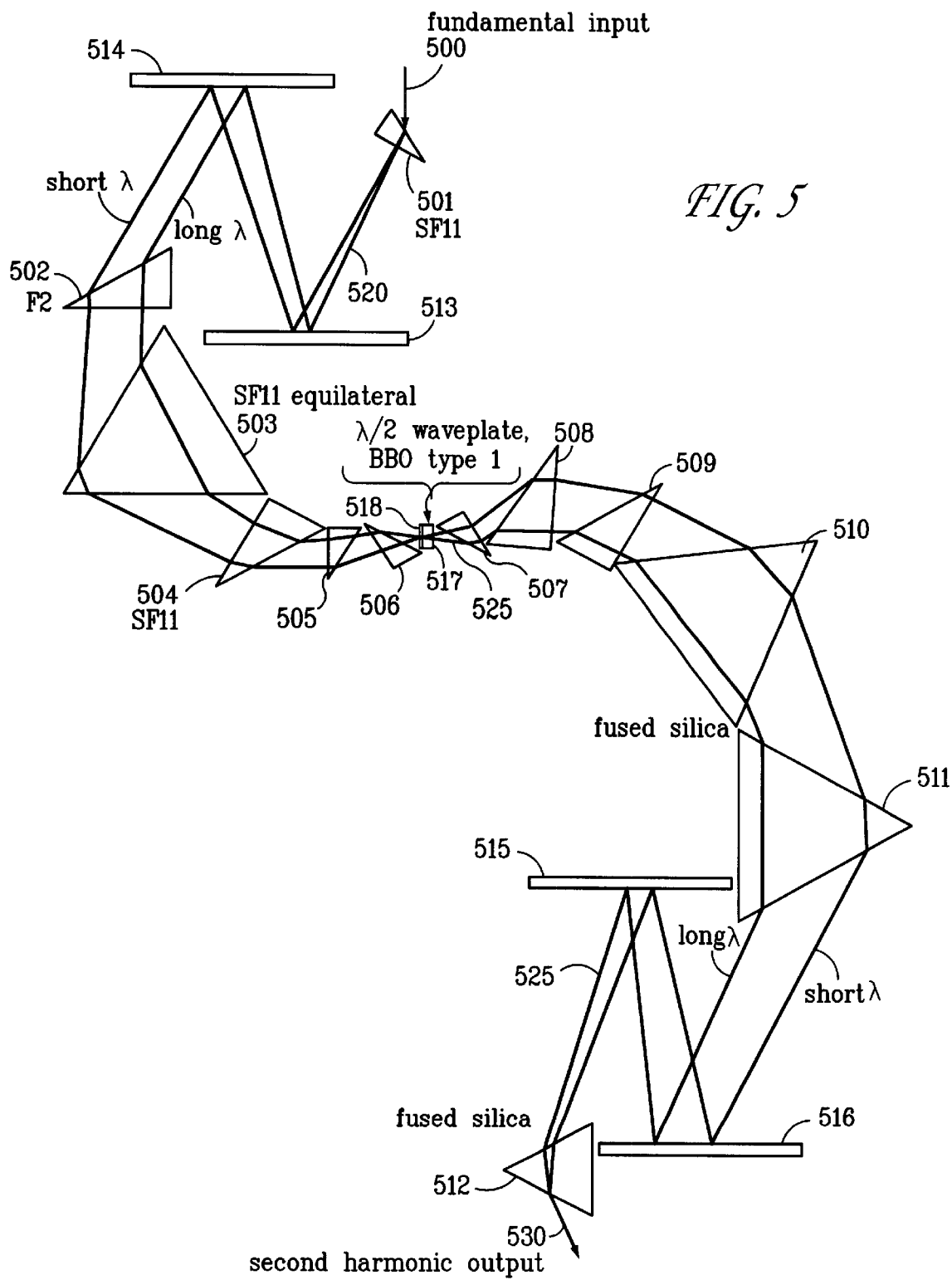
FIG. 5 illustrates the preferred embodiment of the invention; an achromatic phase-matching system designed to match the first and second orders of dispersion to those orders of the phase-matching argle of the SHG crystal using a series of fixed prisms before the crystal and another series of prisms after the SHG crystal to coalign the second harmonic rays/beams emanating from the crystal.

The apparatus and method according to the instant invention is illustrated schematically in FIG. 5. It is noted that throughout this application the term "optical" is used in its broadest sense as pertaining to light. Moreover, the term "light" is used in its broadest sense and includes all forms of electromagnetic radiation and shall not be construed to be limited solely to visible light.

In this application, an APM device is described which is made entirely of prisms operating near Brewster's angle or anti-reflective("AR")-coated for normal incidence. This device also includes dispersion after the SHO crystal to coalign all of the second-harmonic beams 525. It has a full-width-hall-maximum bandwidth of about 110 nm fundamental wavelength centered at 660 nm using a 4 mm-long type 1 BBO crystal for second-harmonic generation. This experimentally derived bandwidth is about 150 times the natural bandwidth of a 4 mm-long BBO crystal cut for type 1 phase-matching.

A single glass prism has only ~$\frac{1}{10}$ the dispersion necessary at the crystal, so ten prisms in series could be used to achieve the required dispersion. Instead, one equilateral prism 503 is used followed by three Littrow prisms (30° apex angle) 504, 505, and 506, each of which not only adds to the dispersion, but also magnifies it as demonstrated in U.S. Pat. No. 5,648,866, (herein incorporated by reference). The broadband input beams 500 enter Littrow prisms 504 through 506 near normal incidence and exit near Brewster's angle (~60°). Each Littrow prism spatially compresses the now dispersed beam 520 in the plane of refraction, which introduces a magnification of the upstream dispersion angle by a factor of about 1.8. Two additional prisms 501 and 502 are used on the input side of the equilateral prism to spatially (but not angularly) disperse the incoming beam 500, so that the angular dispersion introduced by the remaining prisms causes all frequencies to overlap spatially in the crystal. These first two prisms (501 and 502) solve another problem: the magnification of prisms 504, 505, and 506, increases the divergence of beam 520 at each frequency, potentially beyond the acceptance angle of BBO crystal 517. Prisms 501 and 502 are also Littrow, but are oriented with respect to each other, and with the remaining prisms, in order to demagnify the beam divergence, partially compensating for the magnification of the other Littrow prisms. All of the input prisms are made of SF11 glass with the exception of prism 502 which is configured in F2 glass. The material is so chosen so that its index of refraction is smaller than that of prism 501. This must be so in order that the net angular dispersion of prisms 501 and 502 is zero.

The long path between the prisms 501 and 502 is folded twice by two high-reflectivity mirrors 513 and 514. Furthermore, the polarization through the prisms is chosen to be p (in the plane of dispersion) since most optical faces in the APM device are near Brewster's angle and the remaining faces are anti-reflection coated. A zero-order half-wave plate is then required just before the BBO crystal in order to rotate the polarization to s (out of the plane of dispersion) for type 1 phase-matching.

At a nominal wavelength of 650 nm the six prisms on the input side of the APM device shown in FIG. 5 are arranged to constrain light entering and exiting each prism as follows. Prisms 501 and 506 each has its apex angle oriented to the left of the input beam 500 and dispersed beam 520, respectively. Each is rotated so that 650 nm wavelength light is incident at 59.5° and at 0.5°, respectively. Light exits prism 501 at 17.6° and prism 506 at 61.73°. Prisms 502, 503, 504, and 505 each has its apex oriented to the right of the dispersed input beam 520. Furthermore, prisms 502, 503, 504, and 505 are rotated such that light is incident upon them at angles of 59.6°, 60.68°, 1.0° and 1.0° respectively, and exits at angles of −3.67°, 64.78°, 60.83°, and 60.83°, respectively. A zero-order half-wave plate 518 is attached to SHG crystal 517, here a crystal of β barium borate ("BBO"). The purpose of the wave plate is to rotate the incoming light rays by 90° out of the plane of dispersion, i.e., from a polarization of p to a polarization of s in order to match the polarization of crystal 517.

The output side of the device, that is, after BBO crystal 517, is qualitatively the reverse of the input side, but all the prisms are of fused silica. The apex and incident angles are also different from the input. The prisms 511 and 512 do not remagnify the divergence because they have the same index, and hence cannot be arranged analogously to prisms 501 and 502 of the input. No wave plate is needed since the converted light emanating from crystal 517 is again rotated by 90° to a polarization of p. Because of the different magnification from the input, the collinearly aligned output beam 530 is wider than the input by a factor of about 4, which can be compensated for by adding a cylindrical telescope (not shown) after prism 512.

The arrangement of prisms elements is as follows: prisms 507 and 512 have their apex angles oriented to the right of the outgoing beam 525. The remaining prisms, prisms 508 through 511 have apex angles to the left of beam 525. Apex angles of prisms 507 through 509 are 30° while apex angles for prisms 510 through 512 are 68°. For nominal 325 nm output light (½ of the "fundamental" input light) prisms 507 and 512 are rotates so that light is incident on each at angles of 62.5° and 56°, respectively. Light exits each of these elements at angles of −10.12° and 55.89°, respectively. Prisms 508, 509, 510, and 511 similarly are rotated so that 325 nm wavelength light is incident at angles of 64.1°, 64.1°, 64.1°, and 56° respectively, while light exits at an angle of −10.98°, −10.98°, 48.99°, and 55.89°, respectively. The reader should appreciate that many similar arrangements of entrance and exit angles are possible depending upon the chose of prism type and of equivalent structures. The arrangement described above is for illustrative purposes only and should not be construed as in any way limiting or restricting the invention described and disclosed herein.

Figure 6:
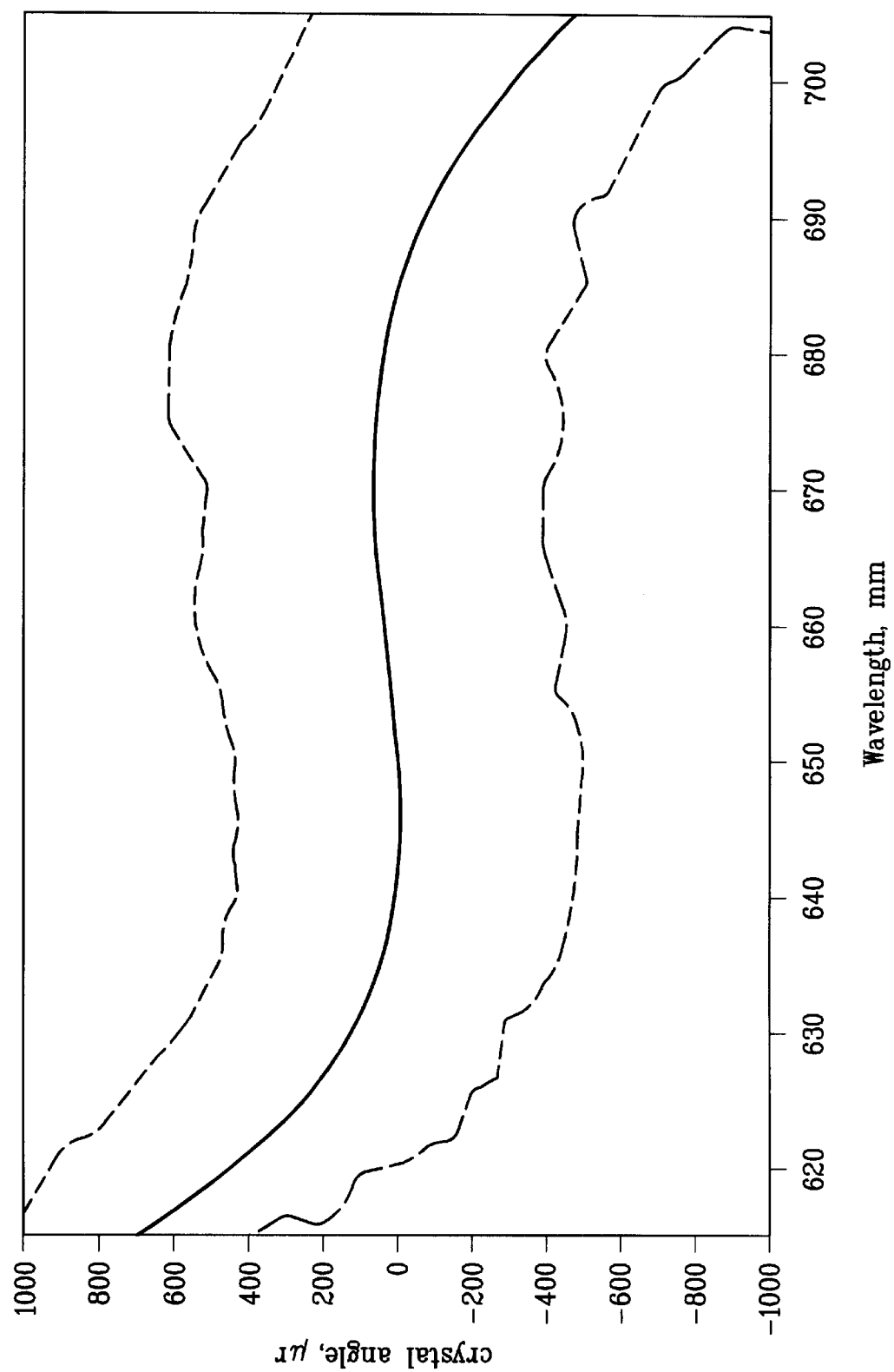
FIG. 6 illustrates a contour plot of the experimentally measured small-signal relative second-harmonic conversion efficiency vs. wavelength and absolute crystal angle. The solid curve is the theoretically predicted difference between the dispersion and exact phase-matching angles for the SHG crystal. Bounding the solid line are model-derived±50% conversion efficiency limits.

The instant invention was characterized with a tunable commercial optical parametric oscillator (OPO) pumped with the third harmonic of a Q-switched Nd:YAG laser. FIG. 6 shows a number of density contours of the experimentally measured relative second-harmonic conversion efficiency as a function of wavelength and absolute crystal angle. Each point is an average of the second-harmonic pulse energy divided by the square of the fundamental energy averaged over several laser shots, and then normalized to the maximum efficiency value at each wavelength to remove the wavelength dependence of the detector and transmission of optical elements. The plot should consist of a $sinc^2$ angle tuning curve at each wavelength. Shown for comparison is the computed difference between the predicted dispersion angle for the preferred embodiment and the exact phase-matching angle of BBO crystal 517. It follows the experimental maxima, as it should. Once the input prisms of the device were pre-aligned to the computed optimum orientations using a red HeNe laser, only one degree of freedom was needed to optimize the dispersion experimentally. This optimization was accomplished by the adjustment of the angles of prisms 503 and 505, so that the angular positions of the maxima of the $sinc^2$ angle tuning curves at two well-separated wavelengths matched the computed difference curve.

Figure 7:
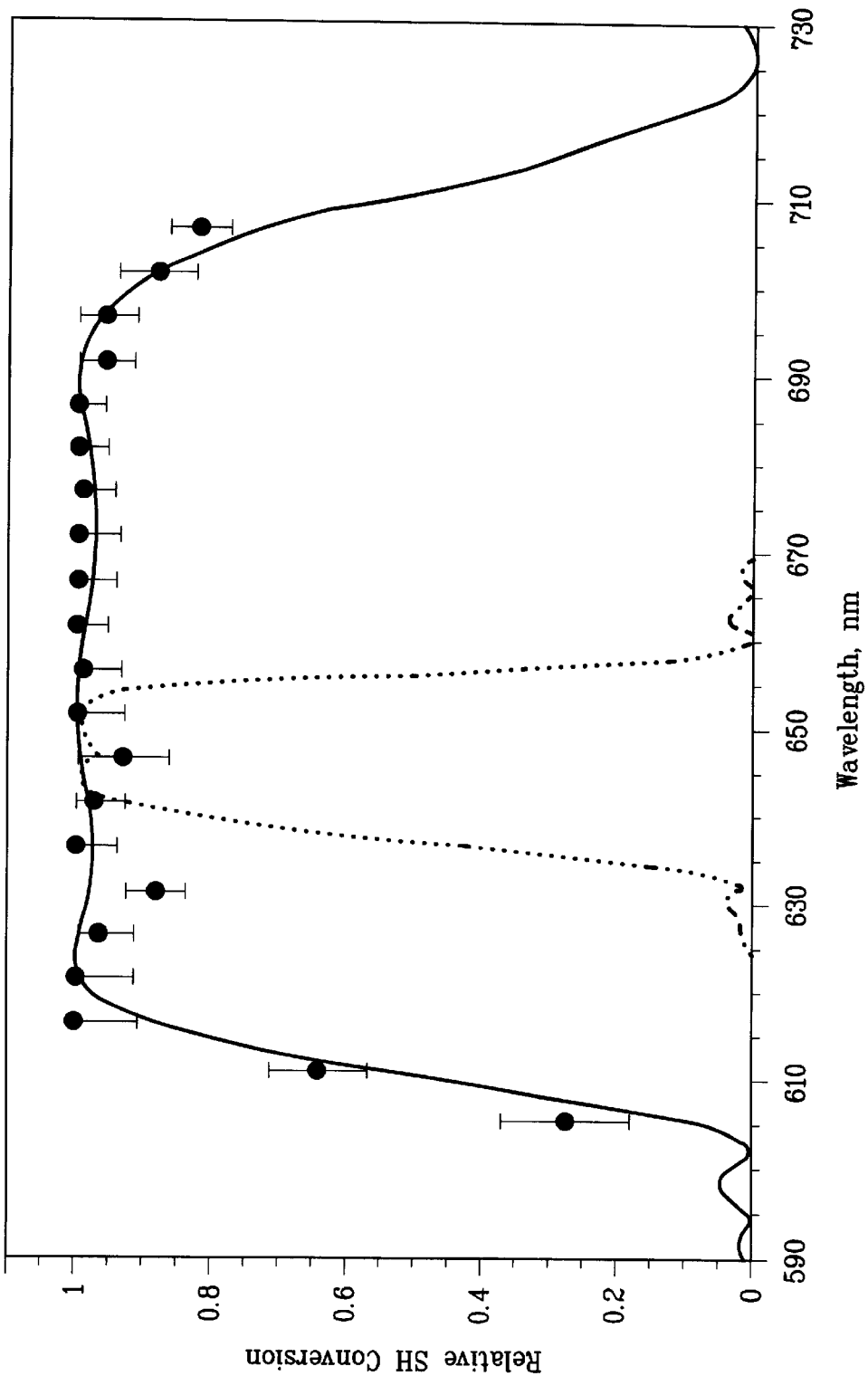
FIG. 7 illustrates another view of FIG. 2 shown as the relative conversion efficiency taken along a fixed absolute crystal angle with respect to an optical table. The figure compares the theoretically predicted relative conversion efficiency (solid curve) with the experimentally measured data. Prior art is shown by the dashed curve.

FIG. 7 is a slice of FIG. 6 at fixed (zero) absolute crystal angle measured with respect to the optical bench. FIG. 7 shows clearly a full-wvidth-half-maximum fundamental bandwidth of approximately 110 nm. The experimental points agree with the relative conversion efficiency computed from the predicted angle difference curve in FIG. 6. Shown for comparison is the predicted relative conversion efficiency of a grating operating at the Littrow condition (diffracted angle=−incident angle), with the correct linear dispersion to imatch the BBO angle tuning curve. Its bandwidth is only 20 nm since it does rot match the BBO angle tuning curve beyond the first order.

The output of the device was also pre-aligned with a red HeNe laser. We measured and coaligned the second-harmonic beam positions and angles precisely using lenses to image them onto a CCD array (after the telescope mentioned above). The output prisms were experimentally optimized by adjusting the angle of prism 505 to provide nearly constant output position and the angle of prism 506 to center the experimental output angle curve with respect to the predicted curve.

Figure 8:
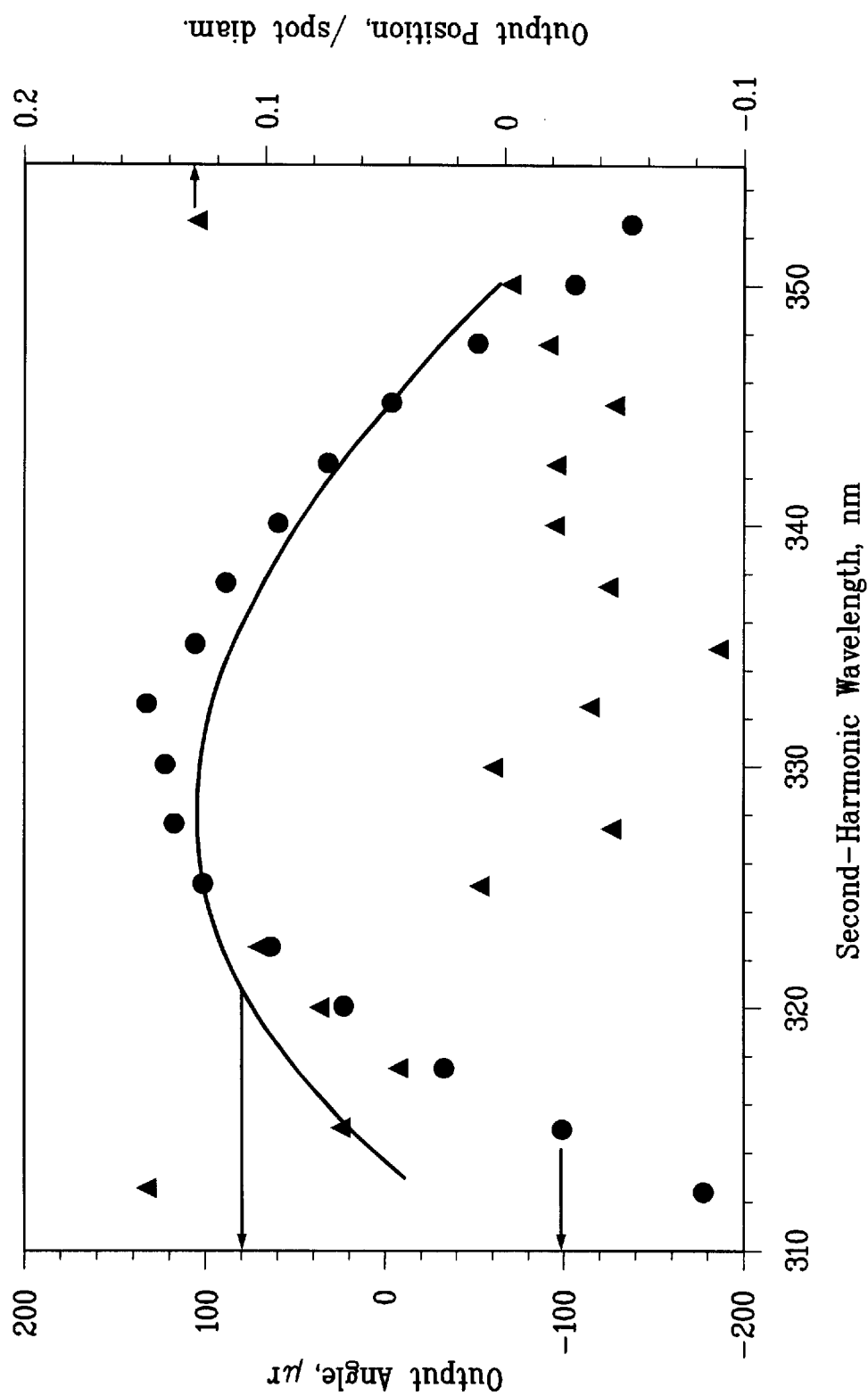
FIG. 8 illustrates the experimentally measured second-harmonic beam position (triangles) and angle (circles) vs. wavelength, in the plane of dispersion, at the output of the preferred embodiment. The solid curve is the model-predicted angle.

FIG. 8 shows the measured position and angle (in the dispersion plane) after the last prism 512 as functions of wavelength, and the angle predicted from the computed optimum prism orientations. The position has been normalized to the spot diameter at the exit of prism 512. Each point is the average of 40 laser shots of the centroid of the beam spots on the CCD, taking into account the magnification of the imaging lenses and the telescope. Since the collinearity is quadratically limited (as the theoretical curve is nearly a parabola), the computed parabolic curvature can be achieved only with perfect alignment of all of the output elements. With even slightly imperfect alignment, the achieved parabola will be sharper, as observed.

The position and angle out of the dispersion plane (vertical) should remain constant over all wavelengths. However, small tilting of a prism can introduce its own vertical dispersion, and couple dispersion from upstream into the vertical plane. A mostly linear dependence was observed of both vertical position and angle on wavelength (slopes of 40 $\mu$m/nm and 15 $\mu$r/nm respectively). One prism is believed responsible for most or all of this dispersion. In theory, this minor problem is easily compensated by tilting other prisms.

We believe that this is the first complete and practical broadband frequency-doubling device.

EMBODIMENT 2

Figure 9:
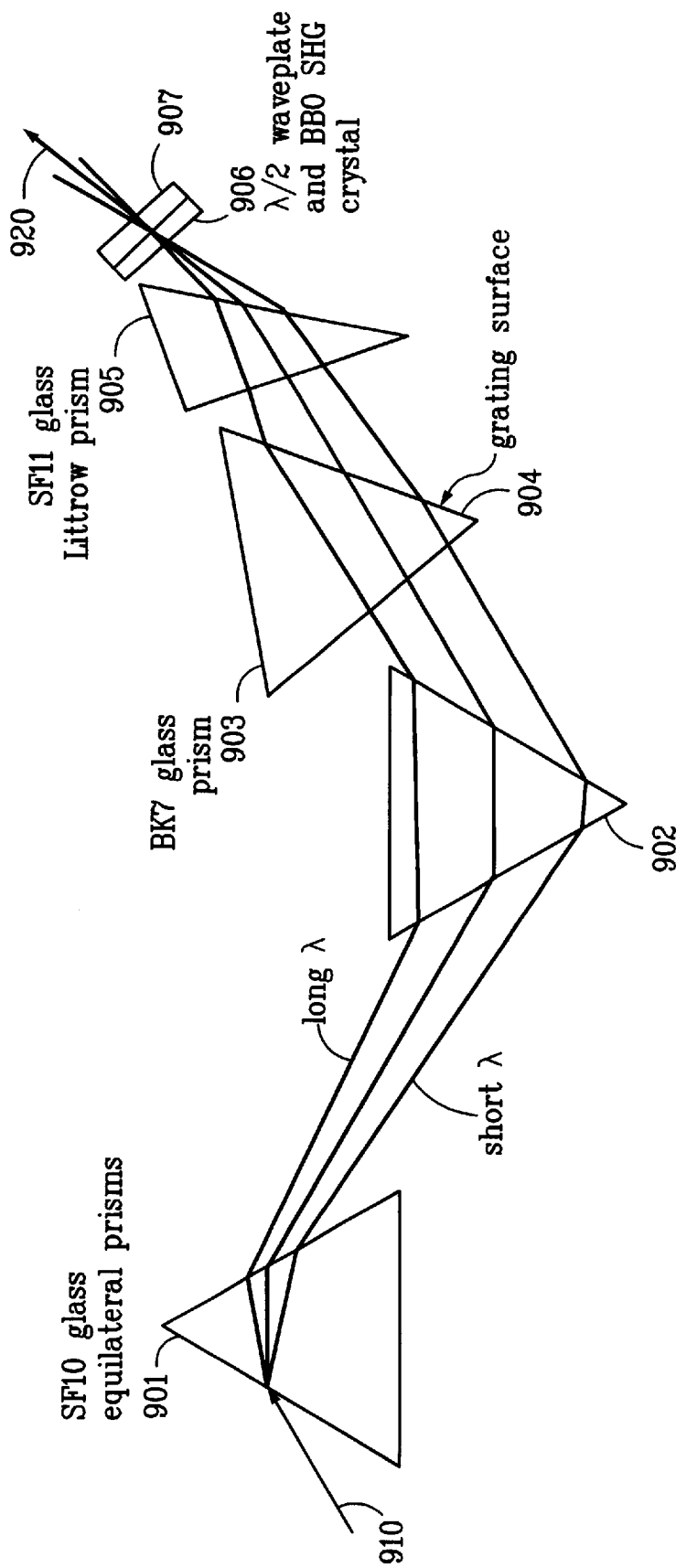
FIG. 9 illustrates embodiment 2; the use of a grism to provide the appropriate first and second order dispersion angle.

An alternate embodiment which utilizes a prism/grating combination, or "grism," to provide the necessary beam dispersion is shown in FIG. 9. This design utilizes four prisms one if which is the prism/grating combination. The grism combination is used because the dispersion of a simple grating cannot simultaneously match both the first and second order terms of the SHG crystal phase-matching angle tuning function whereas the grism can. This is possible because the grating equation for a grating on the exit face of the prism is, $$\sin \theta_o = n\theta_I - b\lambda$$

where n is the refractive index of the grism and b is the groove density of the grating. $\theta_o$ and $\theta_I$ are the diffracted and incident angles, respectively. The linear and quadratic dispersion are, $$\frac{\partial \theta_o}{\partial \lambda} = -b \sec\theta_o, \quad \frac{\partial^2 \theta_o}{\partial \lambda^2} = +\left(\frac{\partial \theta_o}{\partial \lambda}\right)^2 \tan\theta_o$$

When the diffracted angle is negative (as with the Littrow or Bragg conditions), the linear and quadratic terms have the same sign. The beam 910 must cross the normal to the grating for the quadratic term to have the correct sign, but the quadratic term is still of insufficient magnitude relative to the linear term in a normal grating. Because of this property prior art designs that use gratings have limited the achievable phase-matching bandwidth at the crystal to only about 10 times the natural bandwidth of the crystal (~10 nm at 650 nm fundamental wavelength).

Because of the factor n, the grating incident angle $\theta_I$ (inside the grism) can be greater than the critical angle of the grism substrate. With the grism the diffracted angle $\theta_o$, and hence the second order dispersion, can be larger and still of the correct sign than in a normal grating.

FIG. 9 illustrates a schematic of this alternate embodiment. The doubling crystal is a BBO crystal 907 cut for type 1 phase-matching of (nominally) 650 nm light. Crystal 907 is about 4 mm long (i.e., the crystal presents a nominal 4 mm propagation path for the incoming light rays/beams 910) and has a natural phase-matching bandwidth of <1 nm and an acceptance angle of 1 mrad. The first two prisms 901 and 902 serve to disperse the different wavelengths laterally but not angularly. Grism 903 and the Littrow prism 905 together introduce the appropriate higher order dispersion and cause the different wavelengths to converge in SHG crystal 907 at the phase-matched angle appropriate for each.

Prisms 901 and 902 are equilateral (apex angle of 60°) and are constructed of SF10 glass, having an index of refraction of about 1.72. Incidence angles for both are 62.9° and 54.9° respectively. The beam 910 is bent by 56° in both. The optical path length is determined by the size of several elements and the requirement that all wavelengths converge in the crystal. The apex angles of these two prisms are oriented opposite one another, while the apex angles of elements 902, 903 and 905 are all oriented in the same direction.

Grism 903 is an equilateral prism constructed from BK7 glass and having 600-grooves/mm grating 904 on the exit face. 650 nm wavelength light enters the face of grism 903 at an incident angle of 11° and on the grating at 58°. The first diffracted order exits grism 903 at 58° and enters the Littrow prism 905 (apex angle of 30°) at an incident angle of 2°. The Littrow prism 905 is constructed of SF11 glass its apex angle is oriented in the same direction as the two preceding prism elements. The 650 nm wavelength light leaves the Littrow prism 905 at a 63° exit angle.

Again, most of the optical interfaces are near Brewster's angle, necessitating the use of p polarization to eliminate reflective losses. A zero-order half-wave plate 906 is, therefore, placed in contact with, or just prior to, the SHG crystal 907 entrance face in order to rotate the incoming light into a polarization to s so that the crystal phase matching plane would be aligned with the beam dispersion plane.

The ray/beam reconstruction arrangement can be designed similarly with another grism and other prisms, qualitatively in the opposite order as above, but with materials and other properties appropriately chosen such that the net first and second order dispersion of the second-harmonic light matches those terms of the crystal phase-matching angle. Alternatively, the above-described embodiment may also includes an all-prism beam reconstruction arrangement identical to that shown in FIG. 5 as elements 507 through 512. This portion of the embodiment has not been shown for the sake of brevity as it has already been illustrated once. It should not be assumed that because it is not expressly illustrated it is not part of this embodiment. Furthermore, the written description and drawings are provided for illustrative purpose as sufficiently descriptive of the instant invention as to allow one skilled in the art to practice said invention. The foregoing is not and should not be considered to be an exhaustive. Many modifications will be suggested to the skilled artisan upon review of the above disclosure, including embodiments which use only two or one prism in combination with a grism, both for dispersing light before the SHG crystal and for reconstructing the converted beam 920. Accordingly, the invention is only limited by the fair scope of the appended claims.

EMBODIMENT 3

Figure 10:
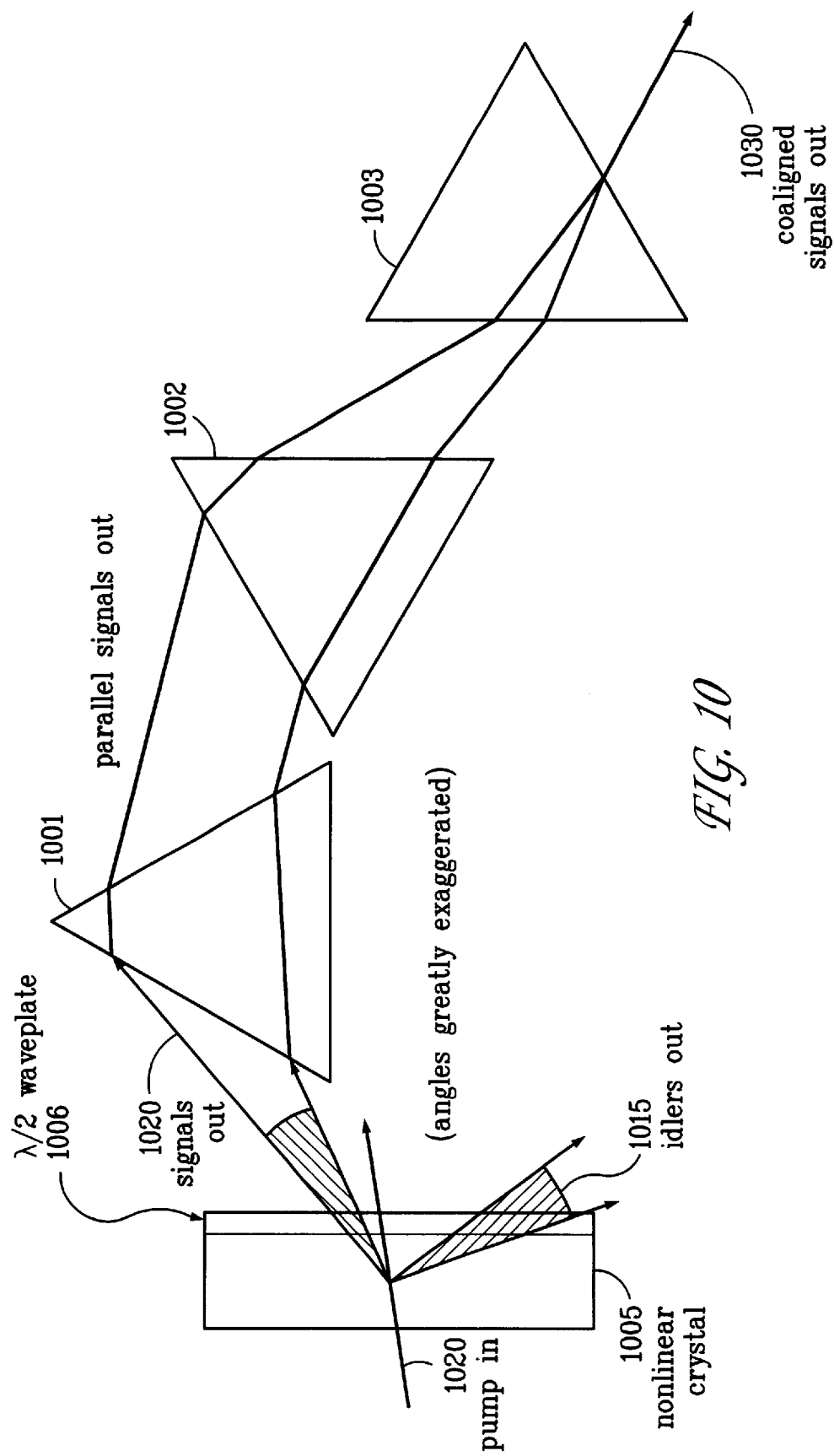
FIG. 10 shows a simplified view of the process for realigning signal or idler beams emanating from an optical parametric generator.
Figure 11:
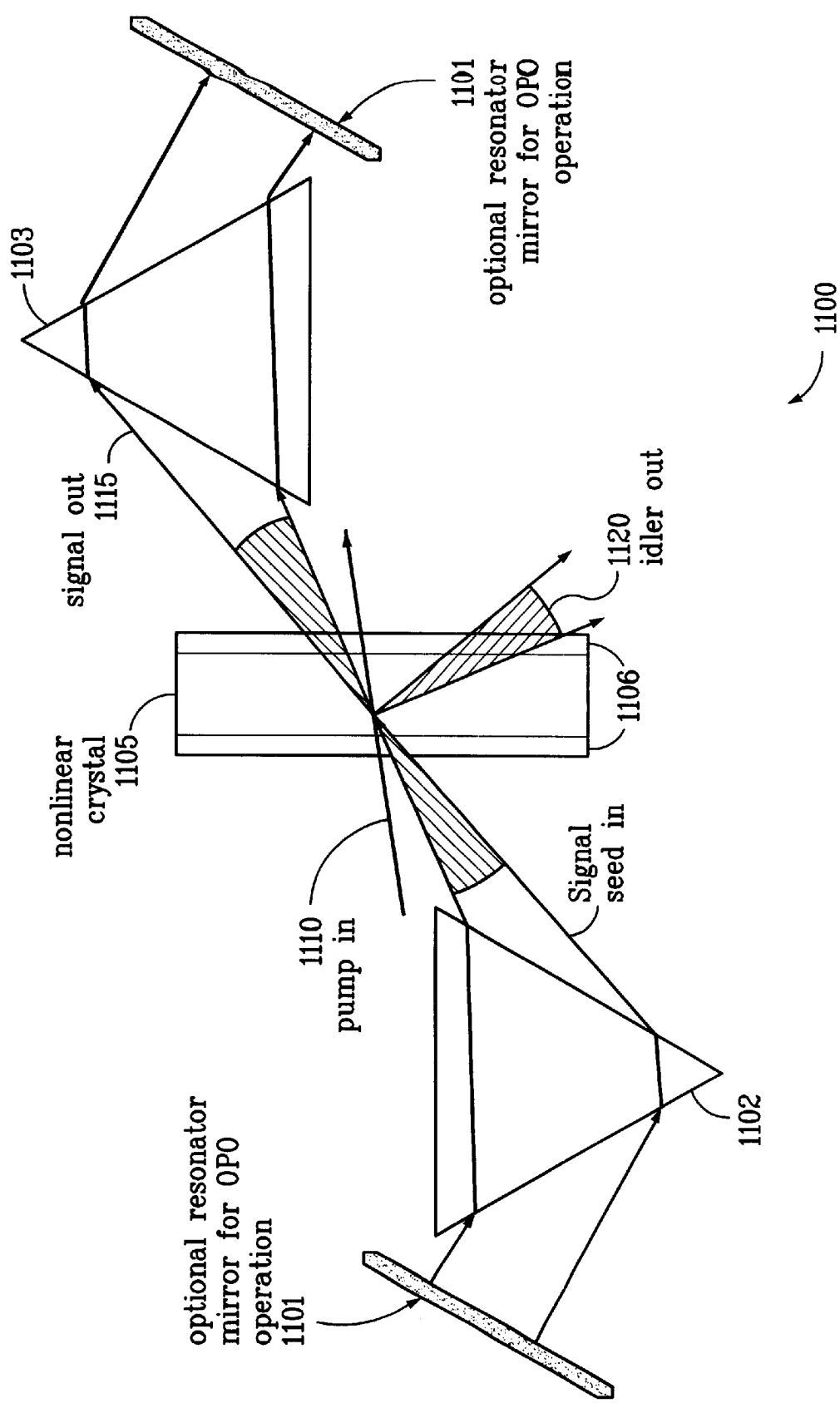
FIG. 11 illustrates embodiment 3 and 4 using the preferred embodiment as an optical parametric amplifier or oscillator.

Illustrated in FIG. 10 is a schematic for an optical parametric generator ("OPG") when mirror elements are not present, and illustrated in FIG. 11 is an optical parametric oscillator ("OPO") when mirror elements are present. Those skilled in the art will appreciate that such a device can be constructed by adding suitably reflective members 1101 on either side of the instant invention described in the preferred embodiment (and illustrated in FIG. 5). Previous work by others describes the construction and operation of broadband optical parametric generators such that the signal (output) beams from the generator are collinear over a large spectral bandwidth. However, in order to achieve this condition, non-collinear phase-matching among the pump (input), signal (primriary output), and idler (secondary output) beams must be used, which sacrifices efficiency.

Modifying the previous design by incorporating APM reduces the non-collinearity of the required phase-matching condition by removing the collinearity condition of the signal beam, 1020 (FIG. 10). This not only increases the conversion efficiency but also broadens the available signal bandwidth. The pump beam 1010 and SHG crystal 1005 remain fixed, but the signal and idler beams 1015 and 1020 respectively, are allowed to change direction as a function of their wavelengths. The fixed pump angle is chosen to optimize phase-matching cumulatively over a desired spectral band using APIVI as described in the foregoing. half-wave plates 1006 may be necessary also necessary on both sides of SHG crystal 1005 in order to properly rotate light entering into the SHG crystal into the s polarization orientation depending on the polarization type of phase-matching being used. APM after the nonlinear crystal then realigns the signal beams 1020 so that all are about parallel (collinear) over the entire signal bandwidth. APM may also be used to align the idler beams 1015 in the same manner. By adding APM before the SHG crystal to align a "seed" signal (or idler) beam to the appropriate phase-match angle it is possible to construct an optical parametric amplifier ("OPA"). Unlike current commercially available designs this embodiment would not require rotating the SHG crystal in order to align the signal (or idler) beams. Elements 1001 through 1003, taken together, schematically represent the APM design practiced in the preferred embodiment; these elements should not be construed as single elements.

EMBODIMENT 4

Finally, as shown in FIG. 11, by adding mirror resonator elements 1101 to create a resonator cavity 1100 (defined as the optical path between reflective resonator elements 1101) and by adding a second tuning element (shown schematically as element 1203 in FIG. 12), such as a grating, the instant invention can be made to operate as a narrowband, tunable optical parametric oscillator ("OPO"). The APM optics may align either the signal beams 1115, or the idler beams 1120 for singly resonant behavior or both set of beams may be simultaneously aligned using possible separate optical pathways for doubly resonant operation.

Figure 12:
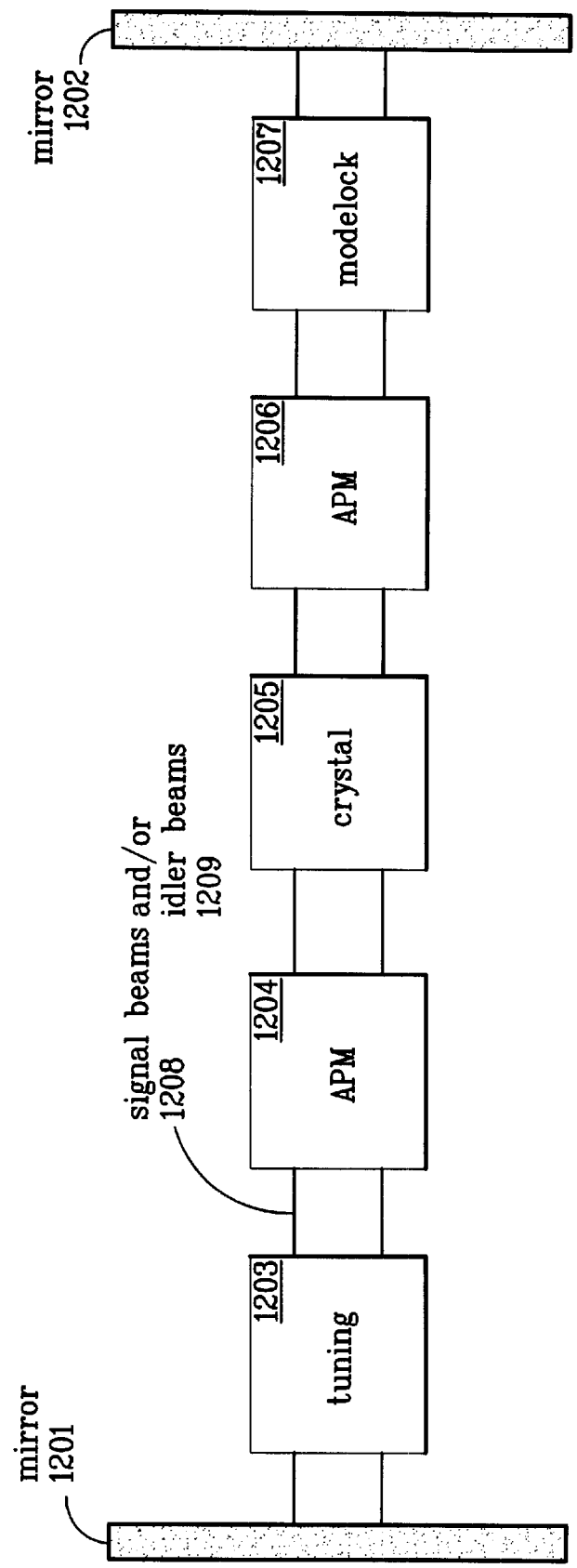
FIG. 12 illustrates a schematic of embodiment 4 wherein the preferred embodiment is configured as an optical parametric oscillator with a mode-locking device for generating ultrashort pulses.

Lastly, as shown schematically in FIG. 12, a mode-locking mechanism selected from any known to the art, may be placed into the optical path of the OPO described in FIG. 11, to mode-lock the broadband output of the SHG crystal and allow the OPO to operate as an ultrashort pulse generator. The pump beam 1100 is permitted to be either synchronous or continuous wave. The APM optics also provide temporal dispersion compensation for the resonator cavity, so that the optical pulse length is minimized at the mode-locking mechanism and maximized at the SHG crystal. Using the pulse stretch/compress ratio of the temporal dispersion between the mode-lock and the crystal which are large enough will allow the pulse length at the crystal will approach the round-trip time. This allows a continuous wave pump to be converted efficiently because the pulse duty cycle at the crystal would be high. This device then can operate at wavelengths not directly or easily attainable with existing pulse generating systems.

The above-described embodiments are provided as illustrative of the instant invention and are not considered exhaustive. Many modifications will be suggested to the skilled artisan upon review of the above disclosure. Furthermore, the written description and drawings as provided herein are for illustrative purposes and are sufficiently descriptive as to allow one skilled in the art to practice said invention. The foregoing is not and should not be considered to be an exhaustive. Accordingly, the invention is only limited by the fair scope of the appended claims.

What is claimed is:

1. An optical system for multiplying a light ray frequency, comprising:
    a nonlinear optical medium having:
        a negative birefringence;
        a plane face for receiving a broadband light beam, wherein said broadband light beam comprises a plurality of light rays and wherein each of said light rays has a frequency and a corresponding wavelength; and
        an optimum entrance angle for every wavelength of light, said optimum entrance angle varying as a high order polynomial function of said light wavelength, said optimum entrance angle an incidence angle measured with respect to a normal to said plane face; and
    a series of optical means for dispersing said broadband light beam into a plurality of said light rays, and for subsequently realigning said light rays such that each said light ray enters said plane face at an angle which approximates said optimum entrance angle for said light ray wavelength to at least a second order of said high order polynomial function, said nonlinear optical medium interacting with each of said light rays entering said nonlinear optical medium at said optimum entrance angle such that each of said light ray frequencies is converted by a constant multiple to provide a converted output beam comprising a plurality of converted output rays.

2. The optical system of claim 1, wherein said series of optical means further comprises:
    an input optical means, said means for receiving and spatially dispersing said broadband light beam providing thereby a dispersed light beam, said dispersed beam comprising said plurality of light rays, each said light ray having a frequency and a corresponding wavelength, said input means aligning said dispersed beam such that said light rays are substantially parallel, said broadband light beam having a type p polarization;

an intermediate optical means, said means for receiving said dispersed beam, said means comprising a plurality of elements arranged in series such that each of said elements impart an incremental angular dispersion to said dispersed beam, each element thereby increasing said dispersed beam angular dispersion;

a terminal optical means for receiving said dispersed beam, said terminal means for causing each of said light rays to converge and to spatially overlap in said nonlinear optical medium, and a zero-order half-wave plate fixedly attached to and parallel with said nonlinear medium plane face, said half-wave plate disposed between said terminal optical means and said nonlinear medium such that said light rays propagate through said half-wave plate before entering said nonlinear medium, said plate for rotating said broadband light beam polarization from said type-p to type-s polarization.

3. The optical system of claim 2, wherein each of said input, said intermediate, and said terminal optical means is a prism or a group of prisms, said prisms having plane surfaces for receiving light, some of said surfaces having an anti-reflection coating.

4. The optical system of claim 3, wherein each of said prisms and said nonlinear optical medium are positionally fixed with respect to each other.

5. The optical system of claim 3, wherein said input optical means comprise first and second Littrow prisms, said first and second Littrow prisms each being a right triangular prism having a prism apex angle of 30°, said first Littrow prism oriented to receive and disperse said broadband light beam providing thereby said dispersed light beam, said second Littrow prism oriented to receive and further disperse said dispersed light beam, said first Littrow prism oriented with said prism apex to the right of the broadband beam light beam entering said prism, said second Littrow prism oriented with said prism apex to the left of said dispersed light beam entering said prism.

6. The optical system of claim 5, wherein said first Littrow prism comprises SF11 glass, and wherein said second Littrow prism comprises F2 glass.

7. The optical system of claim 5, wherein said broadband light beam is incident upon a first plane face of said first Littrow prism at an angle of 59.9° and said dispersed light beam exits a second plane face of said first Littrow prism at an angle of 17.6°, and wherein said dispersed light beam is incident upon a first plane face of said second Littrow prism at an angle of 59.6°, and exits a second plane face of said second Littrow prism at an angle of −3.67°, said angles measured with respect to a normal to each of said prism plane faces.

8. The optical system of claim 3, wherein said terminal optical means comprises a fifth Littrow prism, said fifth Littrow prism being a right triangular prism having a prism apex angle of 30°, said fifth Littrow prism oriented such that said prism apex is positioned to the left of the dispersed light beam entering said prism.

9. The optical system of claim 8, wherein said dispersed light beam is incident upon a first plane face of said fifth Littrow prism at an angle of 0.5°, and exits a second plane face of said fifth Littrow prism at an angle of 61.73° said angles measured with respect to a normal to each of said plane faces.

10. The optical system of claim 8, wherein said fifth Littrow prism comprises SF11 glass.

11. The optical system of claim 2, wherein said intermediate optical means comprises an equilateral prism followed by a third and a fourth Littrow prism each of said Littrow prisms oriented with the prism apex to the right of the dispersed light beam entering said prism, said dispersed beam entering each of said prisms at a near normal angle.

12. The optical system of claim 11, wherein said equilateral prism and said third and fourth Littrow prisms comprise SF11 glass.

13. The optical system of claim 11, wherein further said dispersed light beam is incident upon first plane faces of each of said equilateral prism and said third and fourth Littrow prisms at angles of 60.68°, 1.0°, and 1.0° respectively, and wherein said dispersed light beam respectively exits second plane faces of each of said equilateral prism and said third and fourth Littrow prisms at angles of 64.78°, 60.83° and 60.83°, said angles measured with respect to a normal to each of said plane faces.

14. The optical system of claim 2, wherein the broadband light beam comprises light having a nominal wavelength of 650 nm.

15. The optical system of claim 1 wherein the nonlinear medium comprises a $\beta$-barium borate crystal.

16. The optical system of claim 1, further comprising:
means for reconstructing said converted output rays into a collinear output beam, said converted rays exiting said nonlinear medium having an angular dispersion, said means for reconstructing comprising a plurality of output optical means arranged to collect said converted output rays, said output optical means for de-magnifying said dispersion of said converted output rays and for spatially converging said rays to form a collinear output beam.

17. The optical system of claim 16 wherein said output optical means comprises sixth, seventh, and eighth Littrow prisms followed by first, second, and third isosceles prisms, said prisms arranged in series away from said nonlinear medium, each of said isosceles prisms having an apex angle of 68°, said sixth Littrow prism and said third isosceles prism arranged such that each prism apex is oriented to the right of said converted output beam as said converted output beam enters each of said prisms, said seventh and eighth Littrow prisms and said first and second isosceles prisms arranged such that each prism apex is oriented to the left of said converted output beam as said converted output beam enters each of said prisms.

18. The optical system of claim 17 wherein the prisms consist essentially of fused silica.

19. The optical system of claim 18, wherein said converted output rays are sequentially incident upon respective first plane faces of said sixth, seventh, and eight Littrow prisms at angles of 62.5°, 64.1°, and 64.1°, and sequentially exits second plane faces of said sixth, seventh, and eight Littrow prisms at angles of −10.12°, −10.98°, and −10.98°, respectively, said angles measured with respect to a normal to each of said plane faces.

20. The optical system of claim 18, wherein the converted output rays are sequentially incident upon respective first plane faces of said first, second and third isosceles prisms at angles of 64.1°, 56°, and 56°, and sequentially exits second plane faces of said first, second and third isosceles prisms at angles of 48.99°, 55.89°, and 55.89°, respectively said angles measured with respect to a normal to each of said plane faces.

21. The optical system of claim 16, wherein the converted output rays comprise light having a nominal wavelength of 325 nm.

22. The optical system of claim 16, wherein the collinear output beam has a full-width-half-maximum bandwidth of light of at least about 40 nm.

23. An optical system of claim 1, wherein said series of optical means further comprises:
   an input optical means for receiving and spatially dispersing said light beam providing thereby a dispersed light beam, said dispersed light beam comprising a plurality of light rays, each of said rays having a frequency, $v_i$, a corresponding wavelength, $\lambda_i$, and a polarization, said input optical means aligning said dispersed beam such that said light rays are substantially parallel;
   an intermediate optical means for receiving said dispersed light beam, said intermediate optical means comprising a prism having an index of refraction, n, said prism further having a diffraction grating blazed on an exiting surface of said prism, said grating having a groove spacing of b, said light rays encountering said grating at an angle of $\theta_f$, said grating for diffracting said light rays at an angle $\theta_o$ such that:

$\sin \theta_o = n \sin \theta_f - b\lambda_i;$ said diffracted rays exiting said prism grating and forming a converging diffracted beam;
   a terminal optical means for receiving said diffracted beam, said terminal means for causing each of said light rays to converge and to spatially overlap in said nonlinear optical medium; and
   a zero-order half-wave plate fixedly attached to, and parallel with, said nonlinear optical medium plane face, said half-wave plate disposed between said terminal optical means and said nonlinear optical medium such that said light rays propagate through said half-wave plate before entering said nonlinear optical medium, said half-wave plate for rotating said diffracted beam polarization from a type-p to a type-s polarization.

24. The optical system of claim 23, wherein each of said input optical means and said terminal optical means comprise a prism or a group of prisms, said prisms having plane surfaces, some of said surfaces having an anti-reflection coating.

25. The optical system of claim 24, wherein said input optical means comprise first and second equilateral prisms, said prisms opposed to one another.

26. The optical system of claim 25, wherein said equilateral prisms consist essentially of SF10 glass.

27. The optical system of claim 24, wherein each of said prisms comprising each of said input, intermediate, and said terminal optical means, and said nonlinear medium are positionally fixed with respect to each other.

28. The optical system of claim 24, wherein said intermediate means prism comprises a grism having a grating comprising about 600 grooves/mm, said grism consisting essentially of BK7 glass.

29. The optical system of claim 24, wherein said terminal optical means is a Littrow prism and wherein further said prism consists essentially of SF11 glass, said Littrow prism being a right triangular prism having a 30° apex angle, said converted output rays entering said prism at a near normal angle.

30. The optical system of claim 23 wherein the nonlinear medium comprises a βbarium borate crystal.

31. An instantaneously tunable optical parametric generator, comprising:
   a nonlinear optical medium having:
   a negative birefringence;
   first and second parallel plane faces, said second plane face having a zero-order half-wave plate fixedly attached thereto, said half-wave plate for rotating a light beam polarization from a first polarization type to a second polarization type;
   an optimum entrance angle for every wavelength of light, said optimum entrance angle varying as a high order polynomial function of said light wavelength; and
   an optical pumping beam, said optical pumping beam being a narrow-band coherent light beam having a pumping beam frequency and a corresponding pumping beam wavelength, said optical pumping beam entering said nonlinear optical medium first plane face at an angle matching said optimum entrance angle for said pumping beam wavelength to at least a second order approximation of said high order polynomial function, said optical pumping beam interacting with said nonlinear optical medium to provide converted signal and idler beams having broadened bandwidths, wherein each of said converted signal and idler beams comprises a plurality of output rays having frequencies less than said pumping beam frequency and corresponding wavelengths greater than said pumping beam wavelength; and
   optical means for reconstructing said converted signal beam into a collinear beam, wherein said signal beam output rays are all aligned about parallel to one another, said optical means collecting said converted signal beam output rays, de-magnifying a dispersion of said converted signal beam output rays, and spatially converging said converted signal beam output rays to form said collinear beam, wherein said collinear beam has a bandwidth of about 40 nm.

32. An optical parametric oscillator, comprising:
   an optical resonator cavity comprising:
   a nonlinear optical medium, said nonlinear optical medium having parallel plane faces, said faces having a zero order half wave plate fixedly attached thereto, said nonlinear optical medium further having an optimum optical entrance angle for every frequency of light, said entrance angle varying as a high order polynomial function of said light wavelength, said entrance angle an incidence angle measured with respect to a normal to either of said parallel plane faces;
   an optical pathway passing through said nonlinear optical medium and each said parallel plane face;
   opposing first and second resonator mirrors arranged at opposite ends of said optical pathway; and
   first and second beam alignment means disposed at opposite sides of a nonlinear optical medium between said nonlinear medium and each of said first and second resonator mirrors and lying along said optical pathway, said first and second beam alignment means for directing a collinear light beam onto said first or said second resonator mirrors, said collinear light beam comprising a plurality of about parallel light rays, said first and second beam alignment means arranged to receive and disperse a light beam exiting said nonlinear optical medium, said exiting light beam comprising a plurality of diverging light rays, said first and second beam alignment means de-magnifying a dispersion of said diverging light rays, and spatially converging said diverging light rays to form said collinear beam, said first and second beam alignment means further arranged to receive said collinear beam reflected by said first or said second resonator mirror and to reverse said collinear beam formation to provide thereby a plurality of reflected rays converging into said nonlinear optical medium; and an optical pumping beam, said optical pumping beam being a narrow-band coherent light beam having a pumping beam frequency and a corresponding pumping beam wavelength, said optical pumping beam entering said nonlinear optical medium at an angle matching said optimum entrance angle to at least a second order approximation of said high order polynomial function, said optical pumping beam converted by an interaction in said nonlinear optical medium to provide converted signal and idler beams having broadened bandwidths, wherein each of said converted signal and idler beams comprises a plurality of output rays having frequencies less than said pumping beam frequency and corresponding wavelengths greater than said pumping beam wavelength, said converted signal beam output rays forming a light output beam, said output light beam cyclically propagating between said first and second resonator mirrors by passing through said first and second beam alignment means and said nonlinear optical medium, said light output beam amplified by an interaction with said pumping beam in said nonlinear optical medium once each cycle.

* * * * *